United States Patent [19]

Kita et al.

[11] Patent Number: 4,527,606
[45] Date of Patent: Jul. 9, 1985

[54] PNEUMATIC RADIAL TIRES FOR PASSENGER CARS HAVING LOW ROLLING RESISTANCE AND EXCELLENT SLIPPING RESISTANCE

[75] Inventors: Toshio Kita; Nobumasa Ikeda, both of Kodaira; Takashi Takusagawa, Ohme; Yoshiharu Goto, Kodaira; Hiroshi Hayakawa, Tokyo; Minoru Togashi, Higashimurayama, all of Japan

[73] Assignee: Bridgestone Tire Company Limited, Tokyo, Japan

[21] Appl. No.: 550,733

[22] Filed: Nov. 14, 1983

Related U.S. Application Data

[63] Continuation of Ser. No. 310,253, Oct. 9, 1981, abandoned, which is a continuation-in-part of Ser. No. 114,172, Jan. 22, 1980, abandoned.

[30] Foreign Application Priority Data

Jan. 24, 1979 [JP] Japan ........................... 54-5998

[51] Int. Cl.³ .................. B60C 9/20; B60C 11/00; B60C 1/00
[52] U.S. Cl. .................. 152/209 R; 152/454; 152/526; 152/549; 152/560 J
[58] Field of Search .............. 152/209, 330 R, 357 R, 152/352 R, 361, 374, 360; 156/123, 128.1, 128.6

[56] References Cited

U.S. PATENT DOCUMENTS

| | | | |
|---|---|---|---|
| 1,769,694 | 7/1930 | Jenkinson | 152/374 |
| 3,517,218 | 11/1964 | Brown | 152/330 R |
| 3,707,177 | 12/1972 | Boileau | 152/209 R |
| 3,759,306 | 9/1973 | Greiner et al. | 152/374 |
| 4,319,619 | 3/1982 | Kozima et al. | 152/209 R |

FOREIGN PATENT DOCUMENTS

| | | | |
|---|---|---|---|
| 1809979 | 8/1980 | Japan | |
| 152612 | 11/1980 | Japan | 152/209 R |
| 1603847 | 12/1981 | United Kingdom | |

Primary Examiner—Lois E. Boland
Attorney, Agent, or Firm—Sughrue, Mion, Zinn, Macpeak, and Seas

[57] ABSTRACT

A pneumatic radial tire for passenger cars having a low rolling resistance and an excellent wet skid resistance is disclosed. The radial tire comprises a carcass of a radial construction toroidally extending between a pair of bead cores with the ends turned thereover, a tread portion arranged outside a crown portion of the carcass and having a two laminate structure of tread base rubber and tread cap rubber, and a reinforcing belt layer embedded in the tread base rubber and superimposed about the crown portion of the carcass. The tread base rubber and tread cap rubber have resiliences of not less than 65% and not more than 60%, respectively. The tread portion has a sectional ratio of a sectional area of the tread cap rubber occupied in the equatorial section of tire to a total sectional area of the tread portion of not less than 50% and a negative ratio of not more than 45%. The belt layer has a flatness of not more than 15%.

10 Claims, 8 Drawing Figures

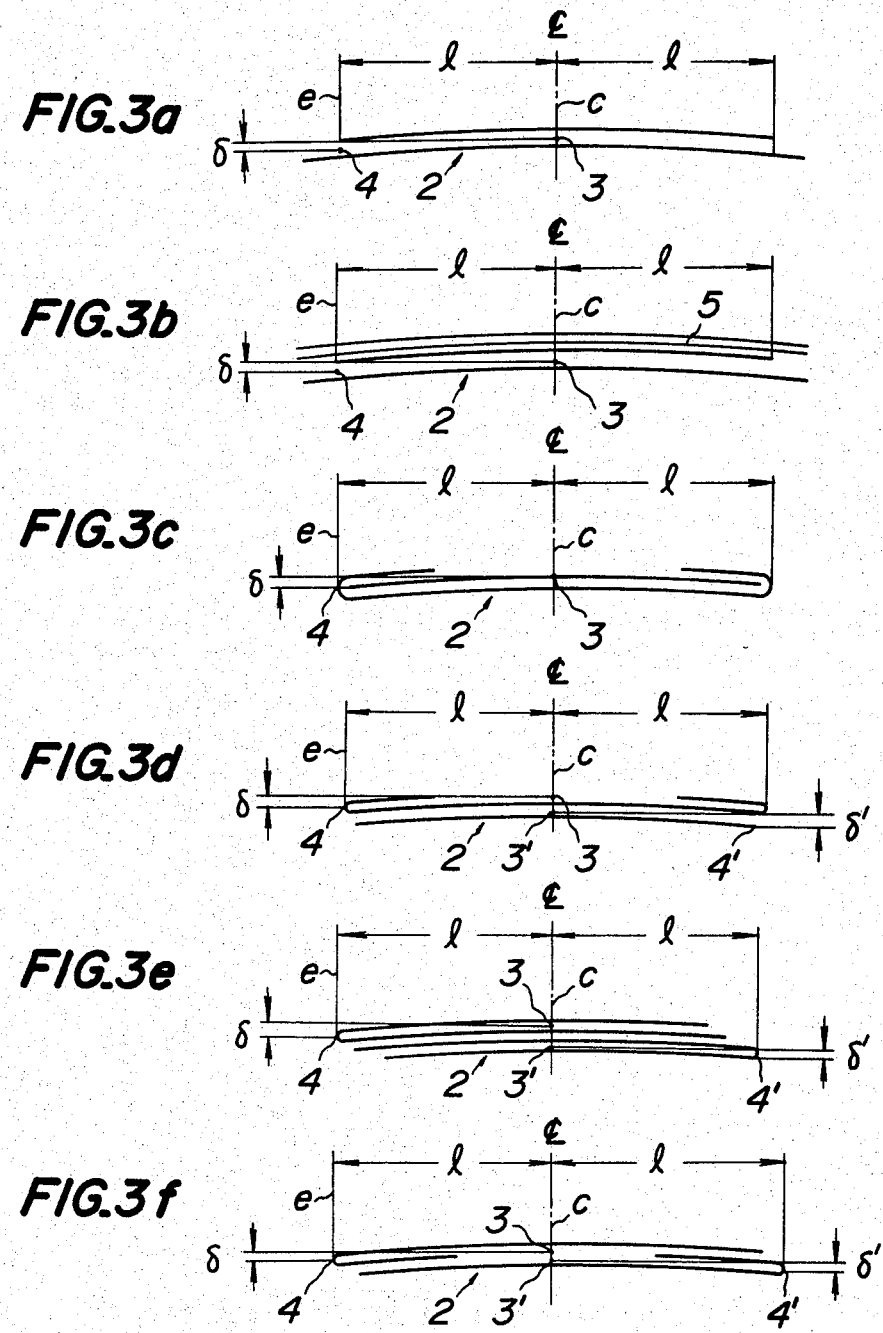

PNEUMATIC RADIAL TIRES FOR PASSENGER CARS HAVING LOW ROLLING RESISTANCE AND EXCELLENT SLIPPING RESISTANCE

This application is a continuation of application Ser. No. 310,253, filed Oct. 9, 1981 now abandoned, which is a continuation-in-part of the co-pending application Ser. No. 114,172 filed Jan. 22, 1980, now abandoned.

This invention relates to pneumatic radial tires for passenger cars, and more particularly to pneumatic radial tires for passenger cars having a low rolling resistance and an excellent wet skid resistance.

In general, it is initially important that the tires for passenger cars are excellent in both the driving and braking performances, particularly the antiskid property or so-called wet skid resistance on road surface under wet conditions.

On the other hand, the research and development of motor vehicles having less gasoline consumption have recently been advanced by the pressures for saving of resource and energy. Particularly, the examination of so-called low fuel consumption tires has advanced in view of diminution of power loss resulted from the tires besides the improvement of engines.

It is generally well-known that the reduction of the rolling resistance of the tire is able to contribute to save the gasoline consumption of a motor vehicle. As factors exerting upon the rolling resistance of the tire, there are qualities of rubber in the tread portion, i.e. kind and properties thereof. In this connection, there is proposed the use of rubber having a small energy loss as far as possible in the tread portion as seen from, for example, Japanese Patent laid open No. 69,101/77, No. 118,705/77 and No. 153,503/77.

However, most of the above proposals fail to notice both the driving and braking performances, which are important requirements in the tire of this type, particularly the antiskid property under wet conditions without sufficient examinations. In the above Japanese Patent laid open No. 69,101/77, these performances are merely taken into consideration in the tire tread pattern, but unsatisfactory results are yet obtained in view of practical uses. Therefore, in order to satisfactorily maintain the wet skid resistance of the tire, it is essential to use rubber having a large energy loss as the tread portion.

In order to solve the above mentioned drawbacks of the prior art, the inventors have aimed at the developmental application of a cap-base structure in the tread portion, which has been appreciatively used in the field of off-road tires (OR tire) or heavy duty tires for truck and bus (TB tire) as a means for mainly avoiding heat generation, i.e. a structure of laminating a tread cap rubber layer on a tread base rubber layer. In the usual tires for passenger cars, the adoption of the above cap-base structure has hitherto been considered to be impossible and completely ignored because the depth of grooves formed in the tread portion of the tire is about 10 mm at most. That is, the rubber gauge of the tread portion is fairly thinner than that of the aforementioned heavy duty tire so that when a green case having a cap-base structure is subjected to a vulcanization step according to the usual manner, the exposure of the tread base rubber is caused at the surface of the tread portion due to the deformation accompanied with flow behavior of rubber in each portion of the tire and consequently it becomes largely difficult to ensure and hold the wet skid resistance.

As a result of examinations based on the numerous experiments of radial tires, however, the inventors have found that the cap-base structure as described above can advantageously be adopted to pneumatic radial tires for passenger cars when considering a sectional ratio of a sectional area $S_c$ of the tread cap rubber occupied in an equatorial section of the tire to a total sectional area S of the tread portion owing to the fact that the deformation of the tread portion is relatively small in the production step of the radial tire.

According to the invention, there is provided a pneumatic radial tire for passenger cars having a low rolling resistance and an excellent wet skid resistance comprising, a carcass of a radial construction composed of a rubberized ply of cords and toroidally extending between a pair of circular bead cores with the ends turned thereover, a tread portion arranged outside a crown portion of said carcass and having a two laminate structure composed of a tread base rubber and a tread cap rubber, and a reinforcing belt layer embedded in said tread base rubber and superimposed about said crown portion of said carcass, said tread base rubber having a resilience of not less than 65%, said tread cap rubber having a resilience of not more than 60%, said tread portion having a sectional ratio of a sectional area $S_c$ of said tread cap rubber occupied in the equatorial section of the tire to a total sectional area S of said tread portion of not less than 50% and a negative ratio of not more than 45%, and said belt layer having a flatness of not more than 15%.

The invention will now be described in greater detail with reference to the accompanying drawings, wherein:

FIGS. 3a–3f are diagrammatical views of modified embodiments for the superimposition of the belt layer, respectively.

Figure 1:
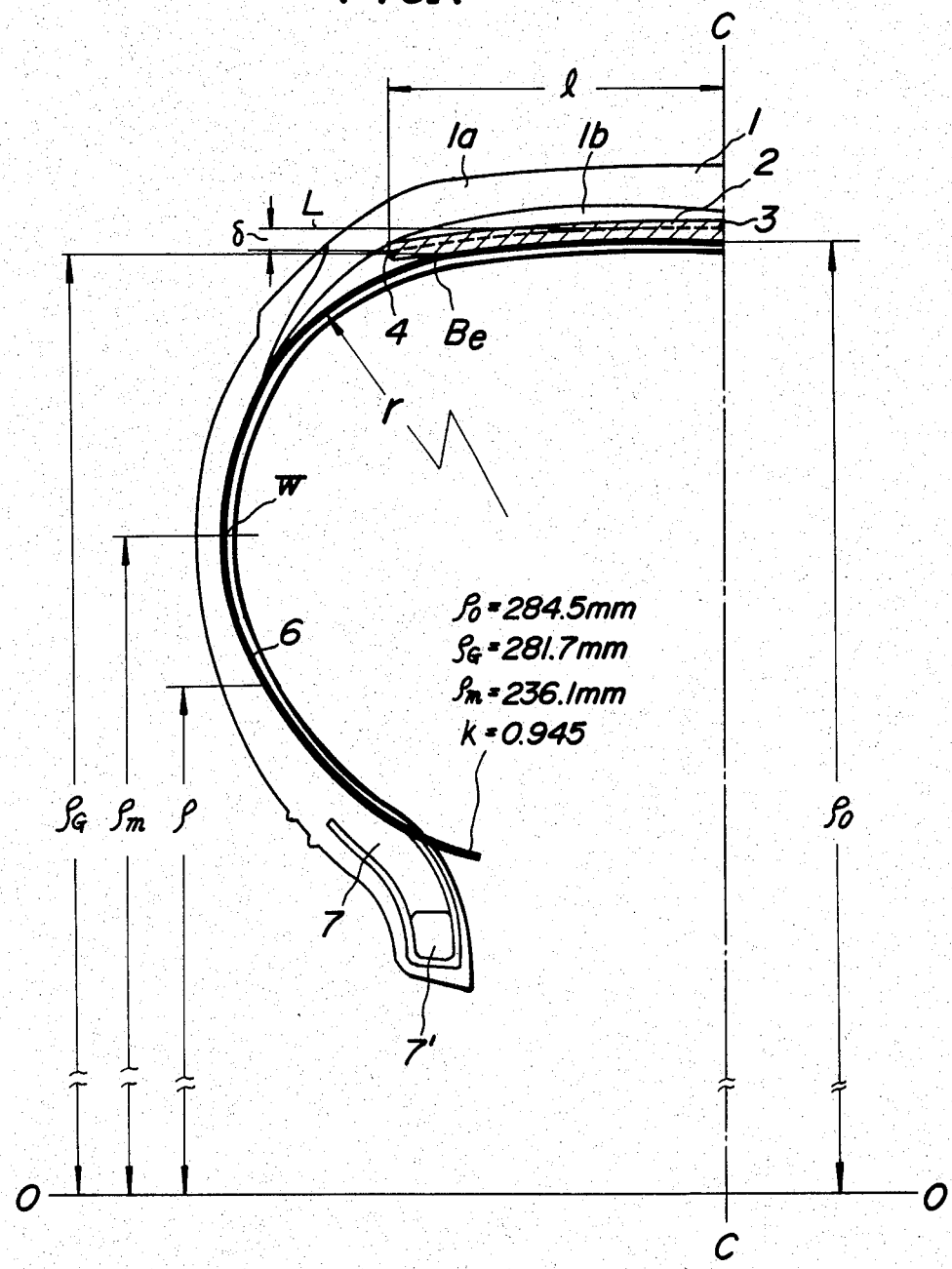
FIG. 1 is a schematic radial half section of an embodiment of the pneumatic radial tire according to the invention.

The negative ratio of the tread portion is expressed by a ratio of an opening area $A_g$ of the tread grooves to a total surface area A of the tread portion ($A_g/A \times 100$, %). Moreover, the flatness of the belt layer is expressed by a ratio of a falling apart $\delta$ of the belt layer, which corresponds to a distance of a perpendicular line drawn from the center of the thickness at the end of the belt layer to a straight line passing through the center of the thickness at the center of the belt layer and parallel to the rotational axis of the tire, to an effective half width of the belt corresponding to a distance between both the centers of the thickness at the end and center of the belt layer. As a rule, the falling part $\delta$ is true of the case that the belt layer 2 as shown in FIG. 1 is usually considered to be a laminate of two rubberized cord fabrics as one set. That is, the laminate composed of two steel cord layers with a free end structure as shown in FIG. 3a is mainly dealt as the belt layer. In the belt layer as shown in FIG. 3b, an additional layer composed of organic fiber cords 5 is excluded for the measurement of the falling part. Further, in the belt layer with a so-called fold structure as shown in FIGS. 3c–3f, a single rubberized cord layer having a folded portion at its either or both sides may be considered as one set of the belt layer. In any case, the falling part $\delta$ and effective half width l can be calculated from schematic layouts of the belt layer under a given internal pressure as a mean value, respectively. These schematic layouts are prepared as follows: that is, the tire is first inflated with air to a given internal pressure and then left to stand over at least one night. Thereafter, models of outermost profile are made with gypsum at several positions in the circumferential direction of the tire. After being deflated, cut samples in radial section are taken out from the tire at the same positions, from which a distance from the surface of the tread to the belt layer is measured to determine an arranged state of the belt layer. Then, the schematic layout at each position is prepared by adapting the above arranged state to the outermost profile.

As shown in FIG. 1, the pneumatic radial tire according to the invention comprises a tread portion 1 with a cap-base structure wherein a tread cap 1a is composed of rubber having a resilience of not more than 60% and a tread base 1b is composed of rubber having a resilience of not less than 65%. When the resilience of the tread cap rubber 1a exceeds 60%, the driving and braking performances are deteriorated, while when the resilience of the tread base rubber 1b is less than 65%, the energy loss becomes large and hence the rolling resistance becomes high. On the other hand, it is required not only to prevent the exposing of the tread base rubber 1b from the surface of the tread portion 1 due to the deformation during the vulcanization, but also to hardly cause the exposure of the tread base rubber even at the last stage of tire use period so as to satisfactorily hold the driving and braking performances. For this purpose, in the tire according to the invention it is essential to have a ratio of tread cap sectional area Sc to tread total sectional area S of not less than 50%.

According to the invention, the rolling resistance of the tire is further lowered by making the flatness of the belt layer 2 as shown in FIG. 1 under a given internal pressure to not more than 15% as a value expressed by a ratio of belt falling part δ, which corresponds to a distance of a perpendicular line drawn from a center 4 of the thickness at the end of the belt layer 2 to a straight line L passing through a center 3 of the thickness at the center of the belt layer 2 and parallel to the rotational axis of the tire, to an effective half width l of the belt layer 2 corresponding to a distance between both the centers 3 and 4.

Figure 2:
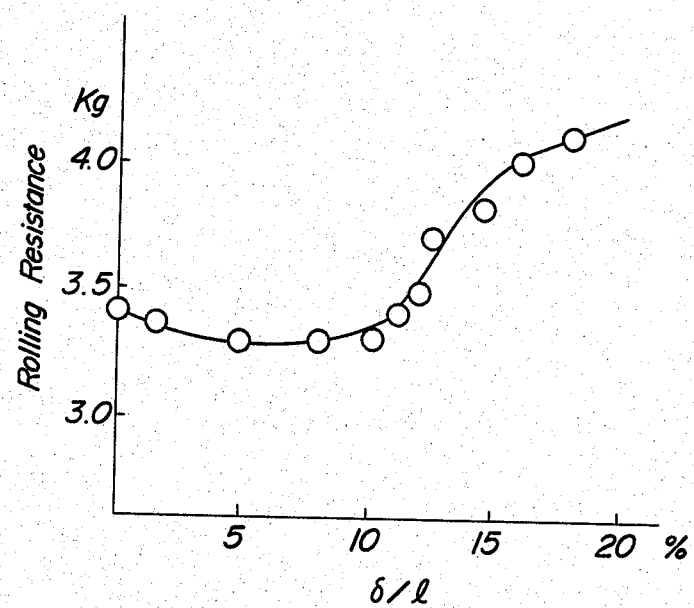
FIG. 2 is a graph showing a relationship between the flatness of the belt layer and the rolling resistance of the tire.

The rolling resistance of the tire is dependent upon the energy loss caused by the repeated deformation during the rotation of the tire. In case of radial tires, the generation of large energy loss particularly results from the strain caused due to the fact that the tread portion is forcedly deformed into a flat shape toward the widthwise direction of the tire and particularly toward the enlarging bowstring direction thereof at the ground contact area. In order to make the strain as small as possible, therefore, it is necessary that the surface shape of the tread portion 1 is close to flat as far as possible in the widthwise direction. In the radial tire, it is particularly necessary to make the curvature of radius of the belt layer 2 in the radial section of the tire large because the deformation of the belt layer 2 having a high rigidity causes the strain in rubber existing in or near the belt layer 2. In FIG. 2 is shown an influence of the flatness δ/l (%) of the belt layer 2 on the rolling resistance, from which it can be seen that the reduction of the rolling resistance is advantageously achieved when the value of δ/l is not more than 15%.

In this connection, various belt structures are illustrated in FIGS. 3a-3f, wherein FIG. 3a shows a usual end-free belt structure, FIG. 3b shows a cap belt structure including the end-free structure but reinforced with organic fiber cord layers 5 outside the belt layer 2, and FIGS. 3c-3f show various fold belt structures. In these figures are denoted δ, δ' and l together with the center 3 or 3' of the thickness at the central position c of the belt layer 2 and the center 4 or 4' of the thickness at the edge position e of the belt layer 2.

The structure of the belt layer 2 as described above is formed as follows. That is, the shape of the tire is first made by vulcanizing a shaped green case in a mold, so that the vulcanized shape in the mold (i.e. mold-in shape) is usually different from the shape of the tire practically subjected to a given internal pressure. In order to approach the shape of the tire under the internal pressure to the objective design, therefore, the planning of the mold is performed by using a theory of natural equilibrium form in radial structure, which has been reported by F. Bohm (ATZ, 69, 1967, pp 225-261) and Akasaka et al (Riko Kiyo of Chuo University, No. 12, 1969, pp 55-70). According to this theory, the natural equilibrium form of carcass line in the radial tire is given by the following equations with reference to FIG. 1:

$$\rho \leqq \rho_G$$

$$r = \frac{\rho_o^2 - \rho_m^2}{2\rho} - \frac{k}{12\rho}(5\rho_o + 3\rho_G)(\rho_o - \rho_G)$$

$$\rho_G \leqq \rho \leqq \rho_o$$

$$r = \frac{\dfrac{\rho_o^2 - \rho_m^2}{2\rho} - \dfrac{k}{12\rho}(5\rho_o + 3\rho_G)(\rho_o - \rho_G)}{1 - k + k\dfrac{(\rho_o - \rho)^2}{(\rho_o - \rho_G)^2}},$$

where r is a curvature of radius of a carcass 6 in the radial section of the tire, $\rho_o$ is a vertical distance from the axial line O—O of said form to a top thereof, $\rho_m$ is a vertical distance from the axial line O—O of said form to a maximum with W thereof, $\rho$ is a vertical distance from the axial line O—O of said form to an optional position thereof, $\rho_G$ is a vertical distance from the axial line O—O of said form to a joint position Be between said form and the belt layer, and k is a stress bearing ratio of the belt layer to the carcass (1 > k > 0).

Here, if the structure of the belt layer is fixed, the rigidity of the belt material used is substantially proportional to "k". In order to make the shape of the belt layer flat, therefore, the belt material is necessary to have a sufficient rigidity and the value of k is obliged to be set approximately 1. As a result, materials having a high rigidity such as steel wire, Kevlar cord and the like are used as a belt material.

From the above equations are obtained innumerable carcass lines, from which is selected a carcass line coincident with the objective design including a tire size, a falling part δ of belt layer and the like. On the thus selected carcass line are placed the belt layer, tread rubber, sidewall rubber, bead filler and the like in given dimensions to determine an outermost profile of the tire, which is rendered the mold-in shape. Thus, the tire having a shape near the objective design is obtained because the shape of the tire under the internal pressure substantially uniformly changes from the mold-in shape.

Moreover, the change of such a shape somewhat deviates from the objective design by the structures of the belt layer 2 and bead portion 7. In this case, however, the objective shape under the internal pressure can be obtained by modifying the mold-in shape to counterbalance the rigidities of the belt layer and bead portion.

By way of an example, when the tire shown in FIG. 1 has a tire size of 185/70-13, the natural equilibrium form is depicted with $\rho_o=284.5$ mm, $\rho_G=281.7$ mm, $\rho_m=236.1$ mm and $k=0.945$, and in this case the effective half width l and falling part $\delta$ and $l=54$ mm and $\delta=6.0$ mm, so that the flatness of the belt layer is $\delta/l \times 100(\%)=11\%$.

In order to make the belt layer flat, there may be employed a method wherein the rubber gauge of the shoulder portion is thinned as far as possible within an acceptable range of product specification so as to produce the buckling of the belt layer, a method wherein the volume of the cushion rubber inserted between the edge portion of the belt layer and the carcass is increased to prevent the falling down of the edge portion of the belt layer, or the like.

According to the invention, it is preferable that the negative ratio expressed by a ratio of sectional area of tread groove to total surface area of tread is not more than 45%. When the negative ratio exceeds 45%, there is a risk that the tread base rubber 1b is exposed at the surface of the tread due to the deformation caused in the vulcanization of the tire.

According to the invention, it is essential that the resilience of each of the tread cap and base rubbers is within the above defined range in the tread portion of the cap-base structure. In order to further improve the contrary performances between the low rolling resistance and the wet skid resistance, it is more preferable that the tread cap rubber satisfies tan $\delta$ at 50 Hz and 60° C. (hereinafter referred to as tan $\delta_A$) of not more than 0.28, tan $\delta$ at 3,000 Hz and 10° C. (hereinafter referred to as tan $\delta_B$) of not less than 0.40 and tan $\delta_B$−tan $\delta_A \geqq 0.20$ as to the dynamic viscoelasticity. This is based on a discovery that in the pneumatic radial tire for passenger car, the value of dynamic loss tangent at 50 Hz and 60° C. (tan $\delta_A$) of the tread rubber is made small in order to improve the rolling resistance, and when the flatness of the belt layer is not more than 15%, the value of dynamic loss tangent at 3,000 Hz and 10° C. (tan $\delta_B$) of the tread cap rubber is made large in order to improve the wet skid resistance.

In the conventional pneumatic radial tires for passenger cars consisting mainly of SBR, the tread cap rubber has tan $\delta_B$−tan $\delta_A=0.10$ to 0.15, which is insufficient to simultaneously establish good rolling resistance and wet skid resistance.

Since the tread cap rubber has a higher contribution to the rolling resistance as compared with the tread base rubber and other portion rubbers, the remarkable improvement of tire performances can be expected when the value of tan $\delta_B$−tan $\delta_A$ is not less than 0.20. Further, it is favorable that the value of tan $\delta_B$−tan $\delta_A$ is not less than 0.25. In the latter case, it is necessary that tan $\delta_A$ is not more than 0.25 and tan $\delta_B$ is not less than 0.45.

In order to improve the wet skid resistance, it is also effective to reduce the dynamic modulus of the tread cap rubber. Preferably, the dynamic storage modulus ($E'_B$) at 3,000 Hz and 10° C. is not more than 350 kg/cm$^2$.

In order to obtain the tread cap rubber having the above mentioned physical properties, there are many blending methods and among them, the following methods are advantageous. Firstly, a rubber composition containing at least two rubbers, i.e. 10 to 60 parts by weight of Rubber-1 having a glass transition temperature (Tg) of not more than −55° C. and 10 to 80 parts by weight of Rubber-2 having a Tg of −50° C. to −30° C., based on 100 parts by weight of total rubber content is used as a tread cap rubber. Secondly, a rubber composition containing at least two rubbers, i.e. 20 to 70 parts by weight of Rubber-1 having a Tg of not more than −55° C. and 5 to 60 parts by weight of Rubber-3 having a Tg of −25° C. to 0° C. is used as a tread cap rubber.

In any case, it is important to blend two or more of mutually compatible rubbers having different glass transition temperatures in order to make tan $\delta$ at low frequency band small and tan $\delta$ at high frequency band large in the tread rubber as mentioned above.

In Japanese Patent laid open No. 50,545/79, it is disclosed to blend a rubber having a Tg of −50° C. to −80° C. with a resin having a Tg of 50° C. to 70° C. In this case, however, the difference in Tg between the rubber and the resin is too large, so that the value of tan $\delta_A$ considerably exceeds the upper limit defined in the invention. Furthermore, the wear resistance and strength at breakage lower, so that such a blend is unsuitable as a tread cap rubber.

In Japanese Patent laid open No. 110,136/80, there is disclosed a method of improving properties of vulcanized rubber compositions wherein tan $\delta$ at low frequency band (76.6 sec$^{-1}$) is made large and tan $\delta$ at high frequency band (890 sec$^{-1}$) is made small when standard temperature (To) is 25° C. However, this method is unsuitable for simultaneously improving the rolling resistance and wet skid resistance.

According to the invention, the following rubbers are preferably used as Rubber-1, Rubber-2 and Rubber-3.

As Rubber-1, mention may be made of natural rubber, synthetic isoprene rubber, and styrene-butadiene copolymer rubbers having a content of bound styrene of 5 to 30% by weight, a content of trans-1,4 bond in butadiene portion of not more than 45% by weight and a content of 1,2-bond of not more than 35% by weight.

As Rubber-2, mention may be made of styrene-butadiene copolymer rubbers having a content of bound styrene of 30 to 50% by weight, a content of trans-1,4 bond in butadiene portion of not more than 45% by weight and a content of 1,2-bond of not more than 35% by weight, and styrene-butadiene copolymer rubbers having a content of bound styrene of 10 to 30% by weight, a content of 1,2-bond in butadiene portion of 50 to 70% by weight and a ratio of content of cis-1,4 bond to content of trans-1,4 bond of not less than 3/7.

As Rubber-3, mention may be made of styrene-butadiene copolymer rubbers having a content of bound styrene of 3 to 10% by weight and a content of 1,2-bond in butadiene portion of 80% to 95% by weight.

In the blending of Rubber-1 with Rubber-2 or Rubber-3, a rubber composition having a good compatible state is obtained by the usually used kneading process using a Banbury's mixer.

Throughout the specification, tan $\delta$ and E' are measured as follows.

A dynamic measurement at a temperature of −100° C. to +150° C. and a frequency of 1 to 100 Hz was made with respect to a specimen obtained by punching a vulcanized rubber sheet of 2 mm thick into a square of 20 mm (length)×5 mm (width) by using a visco-elasticity spectrometer at an initial strain of 5% and an amplitude of 1%. The loss tangent at 50 Hz and 60° C. (tan $\delta_A$) is the found value obtained from the above measurement. The loss tangent at 3,000 Hz and 10° C. (tan $\delta_B$) and the dynamic storage modulus at 3,000 Hz and 10° C. ($E'_B$) are calculated values according to time-temperature conversion rule using a shift factor (log $a_T$) at a measuring temperature of 10° C. according to the following Williams-Landel-Ferry equation:

$$\log a_T = -\frac{c_1(T - Ts)}{c_2 = (T - Ts)},$$

wherein T is a measuring temperature, Ts is (Tg+50), Tg is a glass transition temperature, a unit of each of T, Ts and Tg is an absolute temperature (°K.), and $c_1$ and $c_2$ are $c_1 = 8.86$ and $c_2 = 101.6$ as a standard value.

The invention will be described in greater detail with reference to the following examples.

EXAMPLE 1

Various pneumatic radial tires, each having a belt layer 2 of an end-free structure shown in FIG. 3a and composed of steel cord with a strand structure of 1×5×0.25 were manufactured with a tire size of 165-13 or 185/70-13 (a carcass 6 is one ply composed of polyester cord of 1,500 d/2). The rolling resistance, wet skid resistance and state of tread base rubber arranged were evaluated with respect to these tires to obtain results as shown in the following Table 1.

km/hr and thereafter subjected to rapid braking at the above speed. Then, a running distance required for completely stopping the vehicle was defined by an index on the basis that the tire No. 1 is 100. On the other hand, the vehicle was run on the same wet asphalt road, except that pylons were set at an interval of 30 m, at a speed of 70-80 km/hr over a given section. Then, a time required for passing through the above section was defined by an index on the basis that the tire No. 1 is 100. The wet skid resistance was evaluated as an average value of the above mentioned two indexes. The larger the average value, the better the property.

State of tread base rubber arranged:

The state of the tread base rubber was observed by the dissection of the test tire.

In the above tires, the tread cap rubber 1a having a resilience of 54% and tread base rubber 1b having a resilience of 74% have compounding recipes as shown in the following Tables 2 and 3, respectively. Moreover, the resilience of the rubber can be adjusted to a given value by accounting the addition amount of process oil, the kind and addition amount of carbon black, the addition amount of sulfur and the like in the above compounding recipe. The measurement of the resilience is performed by cutting a rubber sample of 8 mm×8 mm×4±0.1 mm out from the tire and subjecting it to a resilience tester of B.S. standard No. 903, which is made by Toyo Seiki Seisakusho, at room temperature under a hammer weight of 60 g.

TABLE 1

|  | Tire No. | | | | | | | | | | |
|---|---|---|---|---|---|---|---|---|---|---|---|
|  | 1 | 2 | 3 | 4 | 5 | 6 | 7 | 8 | 9 | 10 | 11 |
| Size | 165-13 | 165-13 | 165-13 | 165-13 | 165-13 | 165-13 | 185/70-13 | 185/70-13 | 185/70-13 | 185/70-13 | 185/70-13 |
| Sectional area ratio of cap/base | 10/0 | 4/6 | 5/5 | 5/5 | 5/5 | 5/5 | 7/3 | 5/5 | 5/5 | 5/5 | 5/5 |
| Tread cap rubber resilience, % | 40 | 47 | 47 | 47 | 47 | 65 | 53 | 54 | 53 | 53 | 53 |
| Tread base rubber resilience, % | — | 60 | 60 | 72 | 72 | 74 | 74 | 74 | 74 | 74 | 74 |
| Flatness of belt layer $\delta/l \times 100$, % | 18 | 18 | 18 | 18 | 13 | 18 | 11 | 11 | 11 | 16 | 11 |
| Negative ratio | 27 | 27 | 27 | 27 | 27 | 27 | 28 | 30 | 28 | 28 | 50 |
| Rolling resistance, kg | 5.00 | 4.34 | 4.25 | 3.96 | 3.58 | 3.50 | 3.60 | 3.20 | 3.25 | 3.85 | 3.15 |
| Wet skid resistance, index | 100 | 94 | 94 | 94 | 94 | 79 | 94 | 93 | 94 | 93 | 85 |
| State of tread base rubber | — | exposure | no exposure | no exposure | no exposure | no exposure | no exposure | no exposure | no exposure | no exposure | no exposure |

In Table 1, the rolling resistance, wet skid resistance and state of tread base rubber arranged are measured as follows:

Rolling resistance:

The test tire subjected to an internal pressure of 1.7 kg/cm$^2$ was trained on a steel drum with a diameter of 1707.6 mm and a width of 350 mm, which was rotated by the driving of a motor, at a speed of 80 km/hr under a load of 385 kg for 30 minutes and thereafter the rotating speed of the drum was raised to 200 km/hr. Then, the driving of the motor was stopped to run the drum by inertia, during which the rolling resistance of the tire to the drum at a speed of 50 km/hr was measured on a basis of deceleration speed of drum and time change. Next, a net rolling resistance of the tire was determined by subtracting the previously calculated drum resistance from the measured value.

Wet skid resistance:

A vehicle provided with the test tire was run on a wet asphalt road at a speed of 40 km/hr, 70 km/hr or 100

TABLE 2

| Tread cap rubber (resilience 54%) | |
|---|---|
|  | Parts by weight |
| Natural rubber | 55 |
| Styrene-butadiene copolymer rubber | 25 |
| Polybutadiene rubber | 20 |
| ISAF carbon black | 50 |
| Aromatic oil | 4 |
| Sulfur | 2 |
| N—hydroxydiethylene-2-benzothiazylsulfenamide | 1.5 |

TABLE 3

| Tread base rubber (resilience 74%) | |
|---|---|
|  | Parts by weight |
| Natural rubber | 70 |
| Polybutadiene rubber | 30 |
| HAF carbon black | 32 |
| Aromatic oil | 2 |

TABLE 3-continued

| Tread base rubber (resilience 74%) | |
|---|---|
| | Parts by weight |
| Sulfur | 2.5 |
| N—hydroxydiethylene-2-benzothiazylsulfenamide | 1.8 |

From the data of Table 1, it can be seen that in the pneumatic radial tires according to the invention, the rolling resistance is improved and the wet skid resistance is excellent.

EXAMPLE 2

In this example, there were provided eight kinds of styrene-butadiene copolymer rubbers A–H (hereinafter referred to as SBR-A to SBR-H).

SBR-A and SBR-B were conventional emulsion polymerized SBRs, respectively, wherein SBR-A is SBR 1500 made by Japan Synthetic Rubber Co., Ltd. and SBR-B is one having a higher styrene content than SBR 1500.

SBR-C to SBR-H were solution polymerized SBRs treated with stannic chloride as a coupling agent, respectively. For instance, SBR-G was produced as follows: that is, 25 kg of cyclohexane, 1.2 kg of styrene, 4.8 kg of 1,3-butadiene, 2.54 g of n-butyl lithium, 0.5 g of sodium dodecylbenzene sulfonate and 1.7 g of ethylene glycol dimethyl ether were charged into a reaction vessel of 50 l capacity and polymerized therein at a polymerization temperature of 52.5° C. under a nitrogen atmosphere for 1.3 hours, to which was added 4 g of stannic chloride and thereafter the resulting mixture was maintained at a temperature of 45° C. for 18 hours. Then, after 100 g of 2,6-di-t-butyl-p-cresol was added, the solvent was removed by stripping with steam and the resulting product was dried on a roll heated at 115° C. In this case, the content of 1,2-bond could be controlled by changing the polymerization temperature, while the content of trans-1,4 bond, the content of cis-1,4 bond and others could be controlled by changing the addition amounts of sodium dodecylbenzene sulfonate, ethylene glycol dimethyl ether and n-butyl lithium.

In the following Table 4 are shown microstructures and Tg of each of SBR-A to SBR-H.

TABLE 4

| | Tg (°C.) | Content of bound styrene (wt %) | Butadiene portion | | |
|---|---|---|---|---|---|
| | | | Content of trans-1,4 bond (wt %) | Content of cis-1,4 bond (wt %) | Content of 1,2-bond (wt %) |
| SBR-A | −59.5 | 23.5 | 66 | 15 | 19 |
| SBR-B | −41 | 35 | 64 | 16 | 20 |
| SBR-C | −60.5 | 25 | 40 | 27 | 33 |
| SBR-D | −86 | 6 | 41 | 26 | 33 |
| SBR-E | −42 | 48 | 43 | 29 | 22 |
| SBR-F | −5.5 | 5 | 7 | 4 | 87 |
| SBR-G | −43 | 20 | 25 | 13 | 62 |
| SBR-H | −20 | 28 | 41 | 6 | 53 |

Measurement

The content of bound styrene was measured by means of a spectrophotometer using an absorbance of 699 cm$^{-1}$, and the microstructures in butadiene portion were measured by a D. Morero's method [Chem. & Ind., 41, 758 (1959)].

Tg was measured by a differential scanning calorimeter at a scanning speed of 1° C./min.

By using the above eight kinds of SBRs were prepared 21 kinds of rubber compositions for use in tire tread. After these rubber compositions were press cured at 145° C. for 45 minutes, the resilience, tan δ and E′$_B$ were measured to obtain results as shown in the following Table 5.

Then, 21 kinds of pneumatic radial tires each having the same structure as described in Tire No. 7 of Table 1 were manufactured by using the above mentioned 21 rubber compositions as a tread cap rubber, and thereafter the rolling resistance and wet skid resistance were measured in the same manner as described in Example 1 to obtain result as shown in Table 5.

From the data of Table 5, it can be seen that the contrary performances between the rolling resistance and the wet skid resistance are simultaneously improved when using the tread cap rubber having particular physical properties as defined in the invention.

TABLE 5

| Tire No. | 1 | 2 | 3 | 4 | 5 | 6 | 7 | 8 | 9 | 10 | 11 |
|---|---|---|---|---|---|---|---|---|---|---|---|
| SBR-A | 100 | 70 | 70 | | 15 | | 15 | | 70 | | |
| SBR-B | | 30 | | | | | | | | | |
| SBR-C | | | | 70 | 55 | | | 30 | | 30 | |
| SBR-D | | | | | | 70 | 55 | | | | |
| SBR-E | | | 30 | 30 | 30 | | | | | | |
| SBR-F | | | | | | 30 | 30 | | | | 100 |
| SBR-G | | | | | | | | 70 | 30 | | |
| SBR-H | | | | | | | | | | 70 | |
| NR | | | | | | | | | | | |
| BR | | | | | | | | | | | |
| Carbon black ISAF | 60 | 60 | 60 | 60 | 60 | 60 | 60 | 60 | 60 | 60 | 60 |
| Aromatic oil | 25 | 25 | 25 | 25 | 25 | 25 | 25 | 25 | 25 | 25 | 25 |
| Sulfur | 1.5 | 1.5 | 1.5 | 1.5 | 1.5 | 1.5 | 1.5 | 1.5 | 1.5 | 1.5 | 1.5 |
| Vulcanization accelerator Nobs | 1.5 | 1.5 | 1.5 | 1.5 | 1.5 | 1.5 | 1.5 | 1.5 | 1.5 | 1.5 | 1.5 |
| Resilience (%) | 40 | 32 | 33 | 38 | 36 | 48 | 47 | 45 | 42 | 37 | 40 |
| tan δ$_B$ | 0.44 | 0.59 | 0.58 | 0.57 | 0.58 | 0.53 | 0.54 | 0.53 | 0.46 | 0.63 | 0.83 |
| tan δ$_A$ | 0.28 | 0.37 | 0.34 | 0.25 | 0.27 | 0.20 | 0.22 | 0.20 | 0.27 | 0.30 | 0.28 |
| E′$_B$ | 220 | 375 | 370 | 320 | 330 | 215 | 225 | 285 | 230 | 395 | 450 |
| tan δ$_B$ − tan δ$_A$ | 0.16 | 0.22 | 0.24 | 0.32 | 0.31 | 0.33 | 0.32 | 0.33 | 0.19 | 0.33 | 0.55 |
| Rolling resistance (kg) | 4.75 | 5.10 | 5.05 | 4.50 | 4.40 | 4.05 | 4.15 | 4.05 | 4.70 | 4.85 | 4.55 |
| Wet skid | 104 | 110 | 109 | 108 | 107 | 106 | 106 | 106 | 104 | 104 | 105 |

TABLE 5-continued

| Tire No. | 12 | 13 | 14 | 15 | 16 | 17 | 18 | 19 | 20 | 21 |
|---|---|---|---|---|---|---|---|---|---|---|
| SBR-A | 70 |  | 15 |  | 10 |  | 50 | 25 |  |  |
| SBR-B |  |  |  |  |  |  |  |  |  |  |
| SBR-C |  | 40 |  |  |  |  |  |  |  |  |
| SBR-D |  |  |  | 30 | 20 |  |  |  |  |  |
| SBR-E |  | 30 | 55 |  |  |  |  |  | 25 |  |
| SBR-F |  |  |  | 40 | 40 |  |  |  |  | 25 |
| SBR-G |  |  |  |  |  | 70 | 20 |  |  |  |
| SBR-H |  |  |  |  |  |  |  |  |  |  |
| NR | 30 | 30 | 30 | 30 | 30 | 30 | 30 | 55 | 55 | 55 |
| BR |  |  |  |  |  |  |  | 20 | 20 | 20 |
| Carbon black ISAF | 47 | 47 | 47 | 47 | 47 | 47 | 47 | 50 | 50 | 50 |
| Aromatic oil | 4 | 4 | 4 | 4 | 4 | 4 | 4 | 4 | 4 | 4 |
| Sulfur | 2.0 | 2.0 | 2.0 | 2.0 | 2.0 | 2.0 | 2.0 | 2.0 | 2.0 | 2.0 |
| Vulcanization accelerator Nobs | 1.5 | 1.5 | 1.5 | 1.5 | 1.5 | 1.5 | 1.5 | 1.5 | 1.5 | 1.5 |
| Resilience (%) | 47 | 43 | 39 | 54 | 52 | 55 | 49 | 54 | 55 | 58 |
| $\tan \delta_B$ | 0.36 | 0.52 | 0.64 | 0.50 | 0.53 | 0.50 | 0.39 | 0.25 | 0.40 | 0.43 |
| $\tan \delta_A$ | 0.22 | 0.22 | 0.25 | 0.17 | 0.18 | 0.16 | 0.20 | 0.16 | 0.17 | 0.14 |
| $E'_B$ | 185 | 235 | 285 | 190 | 180 | 190 | 195 | 180 | 200 | 200 |
| $\tan \delta_B - \tan \delta_A$ | 0.14 | 0.30 | 0.39 | 0.33 | 0.35 | 0.34 | 0.19 | 0.09 | 0.23 | 0.29 |
| Rolling resistance (kg) | 4.10 | 4.15 | 4.30 | 3.60 | 3.75 | 3.60 | 4.00 | 3.60 | 3.65 | 3.45 |
| Wet skid resistance, index | 92 | 105 | 110 | 104 | 105 | 105 | 95 | 93 | 101 | 103 |

What is claimed is:

1. A pneumatic radial tire for passenger cars having a low rolling resistance and an excellent wet skid resistance comprising, a carcass of a radial construction composed of a rubberized ply of cords and toroidally extending between a pair of circular bead cores with the ends turned thereover, a tread portion arranged outside a crown portion of said carcass and having a two laminate structure composed of a tread base rubber and a tread cap rubber, and a reinforcing belt layer embedded in said tread base rubber and superimposed about said crown portion of said carcass, said tread base rubber having a resilience of not less than 65%, said tread cap rubber having a resilience of not more than 60%, said tread portion having a sectional ratio of a sectional area Sc of said tread cap rubber occupied in the equatorial section of the tire to a total sectional area S of said tread portion of not less than 50% and a negative ratio of not more than 45%, and said belt layer having a flatness of not more than 15%.

2. A pneumatic radial tire as claimed in claim 1, wherein said two laminate structure comprises two steel cord layers with a free end structure.

3. A pneumatic radial tire as claimed in claim 1, wherein said tread cap rubber has a loss tangent at 50 Hz and 60° C. ($\tan \delta_A$) of not more than 0.28 and a loss tangent at 3,000 Hz and 10° C. ($\tan \delta_B$) of not less than 0.40, and satisfies $\tan \delta_B - \tan \delta_A \geq 2.0$.

4. A pneumatic radial tire as claimed in claim 3, wherein said tread cap rubber has a dynamic storage modulus at 3,000 Hz and 10° C. ($E'_B$) of not more than 350 kg/cm².

5. A pneumatic radial tire as claimed in claim 3, wherein said tread cap rubber satisfies $\tan \delta_A \leq 0.25$, $\tan \delta_B \geq 0.45$ and $\tan \delta_B - \tan \delta_A \geq 0.25$.

6. A pneumatic radial tire as claimed in claim 3, wherein said tread cap rubber comprises a rubber composition containing at least two rubbers, i.e. 10 to 60 parts by weight of Rubber-1 having a glass transition temperature of not more than −55° C. and 10 to 80 parts by weight of Rubber-2 having a glass transition temperature of −50° C. to −30° C. based on 100 parts by weight of total rubber content.

7. A pneumatic radial tire as claimed in claim 3, wherein said tread cap rubber comprises a rubber composition containing at least two rubbers, i.e. 20 to 70 parts by weight of Rubber-1 having a glass transition temperature of not more than −55° C. and 5 to 60 parts by weight of Rubber-3 having a glass transition temperature of −25° C. to 0° C. based on 100 parts by weight of total rubber content.

8. A pneumatic radial tire as claimed in claim 6 or 7, wherein said Rubber-1 is at least one rubber selected from natural rubber, synthetic isoprene rubber and styrene-butadiene copolymer rubbers having a content of bound styrene of 5 to 30% by weight, a content of trans-1,4 bond in butadiene portion of not more than 45% by weight and a content of 1,2-bond of not more than 35% by weight.

9. A pneumatic radial tire as claimed in claim 6, wherein said Rubber-2 is selected from styrene-butadiene copolymer rubbers having a content of bound styrene of 30 to 50% by weight, a content of trans-1,4 bond in butadiene portion of not more than 45% by weight and a content of 1,2-bond of not more than 35% by weight, and styrene-butadiene copolymer rubbers having a content of bound styrene of 10 to 30% by weight, a content of 1,2-bond in butadiene portion of 50 to 70% by weight and a ratio of content of cis-1,4 bond to content of trans-1,4 bond of not less than 3/7.

10. A pneumatic radial tire as claimed in claim 7, wherein said Rubber-3 is selected from styrene-butadiene copolymer rubbers having a content of bound styrene of 3 to 10% by weight and a content of 1,2-bond in butadiene portion of 80 to 95% by weight.

* * * * *